US 6,300,881 B1

(12) United States Patent
Yee et al.

(10) Patent No.: US 6,300,881 B1
(45) Date of Patent: Oct. 9, 2001

(54) DATA TRANSFER SYSTEM AND METHOD FOR COMMUNICATING UTILITY CONSUMPTION DATA OVER POWER LINE CARRIERS

(75) Inventors: David Moon Yee, Scottsdale; Robert Henry Bickley, Paradise Valley; Philip John Zucarelli, Glendale; Theodore Woolley Keller, Scottsdale; Taul Eric Aragaki, Phoenix; Michael Durkin, Cave Creek, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/328,661

(22) Filed: Jun. 9, 1999

(51) Int. Cl.[7] ............................. G08B 23/00; G08C 15/06
(52) U.S. Cl. ............................. 340/870.02; 340/870.03; 340/870.07; 340/310.01
(58) Field of Search ..................... 350/870.02, 870.03, 350/870.07, 310.01; 714/796; 379/106.03

(56) References Cited

U.S. PATENT DOCUMENTS

| 3,688,271 | * | 8/1972 | Rouse | 340/870.03 |
|---|---|---|---|---|
| 4,731,575 | | 3/1988 | Sloan | 324/113 |
| 4,795,892 | | 1/1989 | Gilmore et al. | 235/381 |
| 4,945,549 | * | 7/1990 | Simon et al. | 375/280 |
| 4,965,586 | | 10/1990 | O'Neill et al. | 342/357 |
| 5,056,107 | | 10/1991 | Johnson et al. | 375/1 |
| 5,146,067 | | 9/1992 | Sloan et al. | 235/381 |
| 5,303,287 | | 4/1994 | Laborde | 379/59 |
| 5,353,332 | | 10/1994 | Raith et al. | 379/59 |
| 5,448,230 | | 9/1995 | Schanker et al. | 340/870.03 |
| 5,493,287 | | 2/1996 | Bane | 340/825.52 |
| 5,533,027 | | 7/1996 | Akerberg et al. | 370/195.1 |
| 5,541,589 | | 7/1996 | Delaney | 340/870.02 |
| 5,553,094 | | 9/1996 | Johnson et al. | 375/200 |
| 5,574,951 | | 11/1996 | Sawyer et al. | 395/865 |
| 5,581,547 | | 12/1996 | Umeda et al. | 370/342 |
| 5,590,179 | | 12/1996 | Shincovich et al. | 379/107 |
| 5,594,782 | | 1/1997 | Zicker et al. | 379/63 |
| 5,608,780 | | 3/1997 | Gerszberg et al. | 379/58 |
| 5,659,300 | | 8/1997 | Dresselhuys et al. | 340/870.02 |
| 5,768,531 | | 6/1998 | Lin | 395/200 |
| 5,892,758 | * | 4/1999 | Argyroudis | 340/870.02 |
| 5,898,904 | * | 4/1999 | Wang | 455/31.3 |

FOREIGN PATENT DOCUMENTS

| 676398 | 1/1991 | (CH) . | |
| 9810299 | 3/1998 | (WO) | G01R/22/00 |
| 9830912 | 7/1998 | (WO) . | |

* cited by examiner

*Primary Examiner*—Timothy Edward, Jr.
(74) *Attorney, Agent, or Firm*—Steven R. Santema

(57) ABSTRACT

Utility consumption data is provided over power line carrier links to local nodes and routed through a network of local nodes over peer-to-peer line-of-sight RF links to a utility service provider. Backhauler nodes combine the utility consumption data from the local nodes within a coverage region for routing to the utility service provider. Consumer nodes include sensing elements for measuring the utility consumption data, and switching elements for connecting or disconnecting the utility from a consumer location. Messages are sent through the network requesting the utility consumption data and for activating the switching elements.

21 Claims, 5 Drawing Sheets

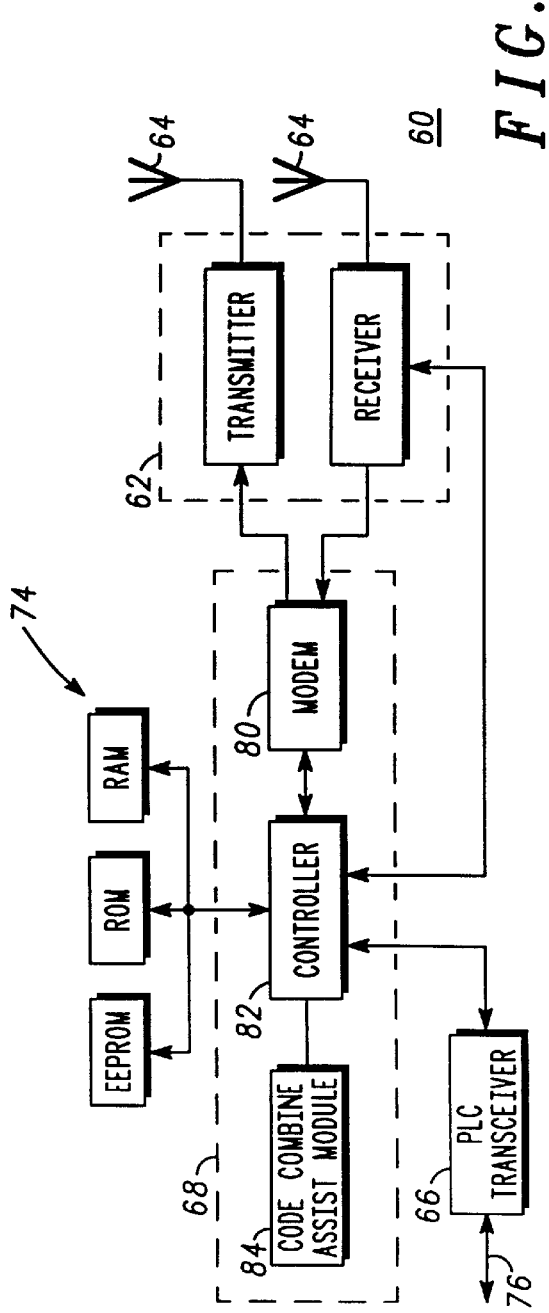
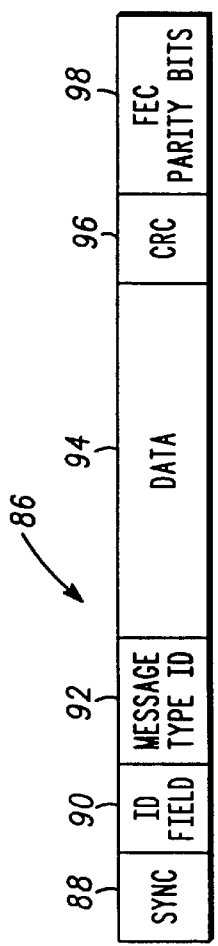
FIG. 3
FIG. 4

DATA TRANSFER SYSTEM AND METHOD FOR COMMUNICATING UTILITY CONSUMPTION DATA OVER POWER LINE CARRIERS

FIELD OF THE INVENTION

This invention relates in general to communication networks, and specifically to communication networks that use power lines for collecting data, and more specifically to communication networks that support communication between geographically distributed entities. The invention also relates to automatic meter reading.

BACKGROUND OF THE INVENTION

Current schemes for collecting information from geographically distributed sources, for example utility meters, present a number of problems. Manual data collection methods such as those employing human meter readers are costly slow and error-prone. More automated methods generally require large capital outlays, have inadequate capacity to deliver information in a timely manner and are relatively expensive to operate and maintain. Thus, what is needed is an improved method and apparatus for collecting information from geographically distributed sources. What is also needed is an improved method for more efficiently and more accurately collecting utility information from utility meters. Further, what is needed is an improved method and apparatus for collecting information from geographically distributed sources that may be maintained and operated at a lower cost.

SUMMARY OF THE INVENTION

Utility consumption data is provided over power line carrier links to local nodes and routed through a network of local nodes over peer-to-peer line-of-sight RF links to a utility service provider. Backhauler nodes preferably combine the utility consumption data from the local nodes within a coverage region for routing to the utility service provider. Consumer nodes include sensing elements for measuring the utility consumption data, and preferably switching elements for connecting or disconnecting the utility from a consumer location. Messages are routed through the network to consumer locations, and for example, may request the utility consumption data or activate the switching elements.

In accordance with another embodiment of the present invention, two-way data may be transferred amongst consumer locations or may be communicated with mobile units within coverage areas of the local nodes.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 3 is a simplified block diagram illustrating a local node transceiver station in accordance with a preferred embodiment of the present invention;

FIG. 4 is a simplified block diagram illustrating a data packet suitable for use with a preferred embodiment of the present invention;

The exemplification set out herein illustrates a preferred embodiment of the invention in one form thereof, and such exemplification is not intended to be construed as limiting in any manner.

DETAILED DESCRIPTION OF THE DRAWINGS

In accordance with a preferred embodiments of the present invention, the present invention provides a communication network for two-way data transfer and communication. The present invention also provides apparatus suitable for collecting data from consumers and, for example, providing the data to a data consumer. In accordance with the preferred embodiment, the data collection is done in a substantially automated manner. Although the present invention is described with respect to the collection of utility data, the present invention is equally suitable for use with the collection of other data. In accordance with the different embodiments described below, the present invention provides a system and method for two-way data transfer, geolocation of mobile units, and sending pages.

Figure 1:
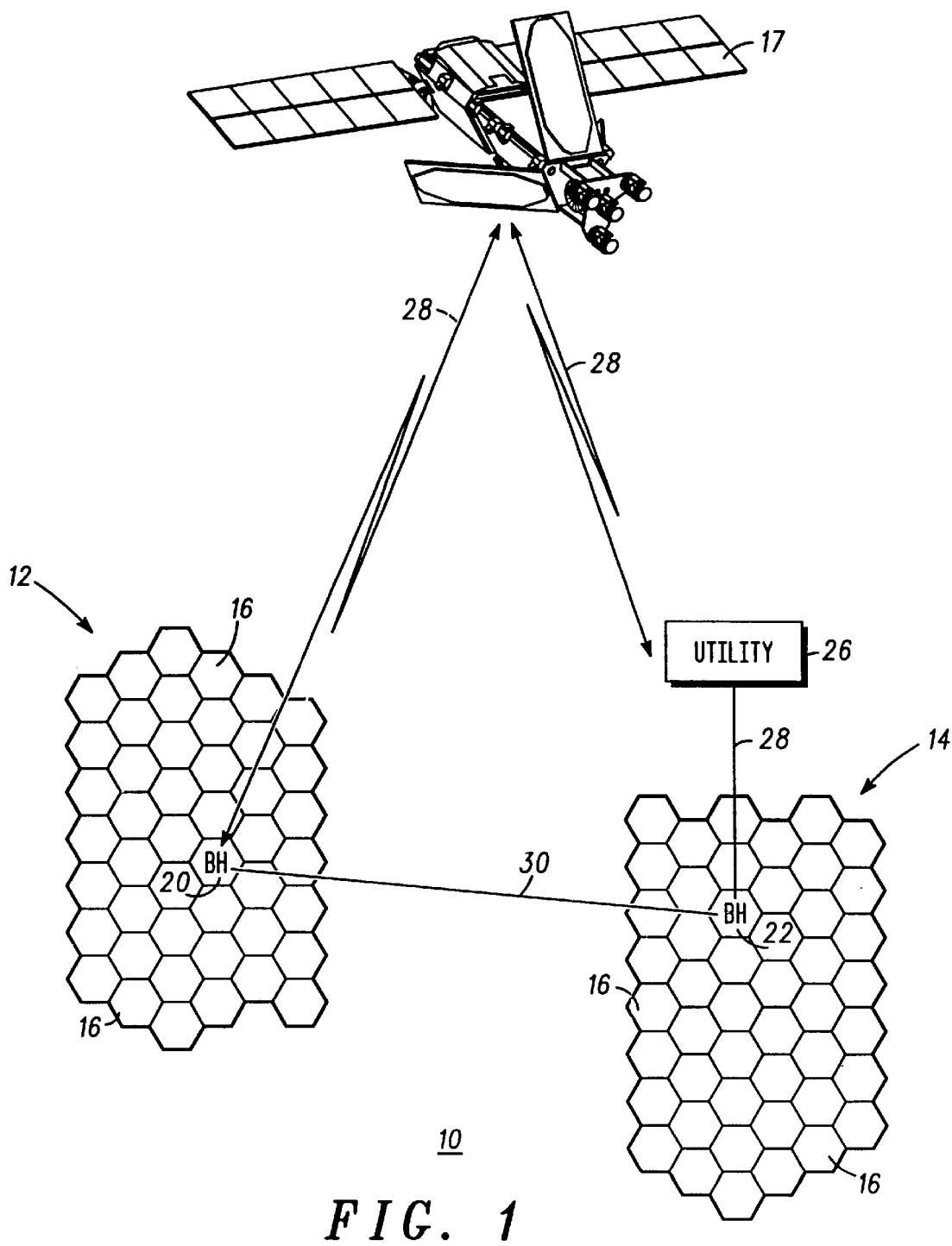
FIG. 1 is a simplified diagram illustrating an environment in which the communication network of the present invention be practiced.

FIG. 1 is a simplified diagram illustrating the environment in which the communication network of the present invention may be practiced. Communication services are provided within and between first and second coverage areas 12 and 14. In accordance with the preferred embodiment of the present invention, a relatively large number of contiguous coverage areas are serviced for providing communications over large geographic regions. Each of the coverage areas 12 and 14 include a plurality of cells 16. Each cell is preferably serviced by a local node. Each cell preferably has a wireless transceiver station for communicating with at least the other local nodes in adjacent cells within a particular coverage area.

In accordance with the preferred embodiment of the present invention, the transceiver station of each local node establishes peer to peer wireless links with transceiver station of adjacent cells or nearby cells. These wireless links are preferably radio line of sight in a particular coverage area. The peer to peer links are used to route communications through the coverage areas to individual local nodes. For example, a group of peer to peer wireless links may be concatenated to form a channel of communications between non-adjacent cells. In accordance with one embodiment of the present invention, multiple cell hops form communication channels within a particular coverage area. These multiple cell hops provide longer distance connections within a particular coverage area. Each individual coverage area 12 and 14 for example, includes respectively backhaul stations 20 and 22 for providing a communication link between its coverage area and communication entities outside its particular coverage area. For example, backhaul station 20 may communicate with an external entity, such as utility 26, by communication channel 28. Communication channel 28 may be a pre-existing or established communication channel or a communication channel dedicated to network 10. Communication channel 28 may comprise communication paths using fiber-optic wireline, wireless, internet, or satellite uplink and downlink communication paths. As shown in the example of FIG. 1, communications from backhaul station 20 may be routed through communication link 28 to utility 26 via satellite 17. Satellite 17 may include a network of communication satellites, which allow for communication of data between backhaul station 20 and entity 26 located in geographically remote locations.

In accordance with another preferred embodiment of the present invention, backhaul station 20 communicates with backhaul station 22 over communication link 30. Accordingly, communications may take place between local nodes in one coverage area and local nodes of another coverage area through the associated backhaul stations over link 30. In this preferred embodiment of the present invention, link 30 and link 28 are preferably RF links and are desirably in the GigaHertz frequency range.

In accordance with the preferred embodiment of the present invention, individual coverage areas may be non-uniform in both size and shape. The use of peer to peer links between cells rather than direct line-of-sight connections to a backhaul station provides for this. Because communications are preferably routed through a particular coverage area from cell to cell utilizing peer to peer links, backhaul stations may be located anywhere within a particular coverage area. In accordance with a preferred embodiment of the present invention, communications between any two local nodes or communications between a backhaul station and a local node may be routed through the network of local nodes through any combination of routes. These different routes provide path redundancy, which greatly increases reliability of communications with the network 10. Different routes through a coverage area are preferably used to connect a first cell to a backhaul station during any particular messaging operation. Redundant transmission paths, for example, increase the network's immunity to interference, blockages and node failures. In accordance with the preferred embodiments of the present invention, each local node has a coverage area that preferably services multiple customer locations within a particular cell. Preferably, each local node communicates with a plurality of customer locations and collects data from each customer and transfers the data over the peer to peer links to the backhaul station for the covered area. The backhaul station provides the data, for example, to entity 26. In accordance with the preferred embodiments of the present invention, this data includes power consumption data and other utility data from a customer location. Entity 26 may also provide data to consumer locations within a particular cell.

Figure 2:
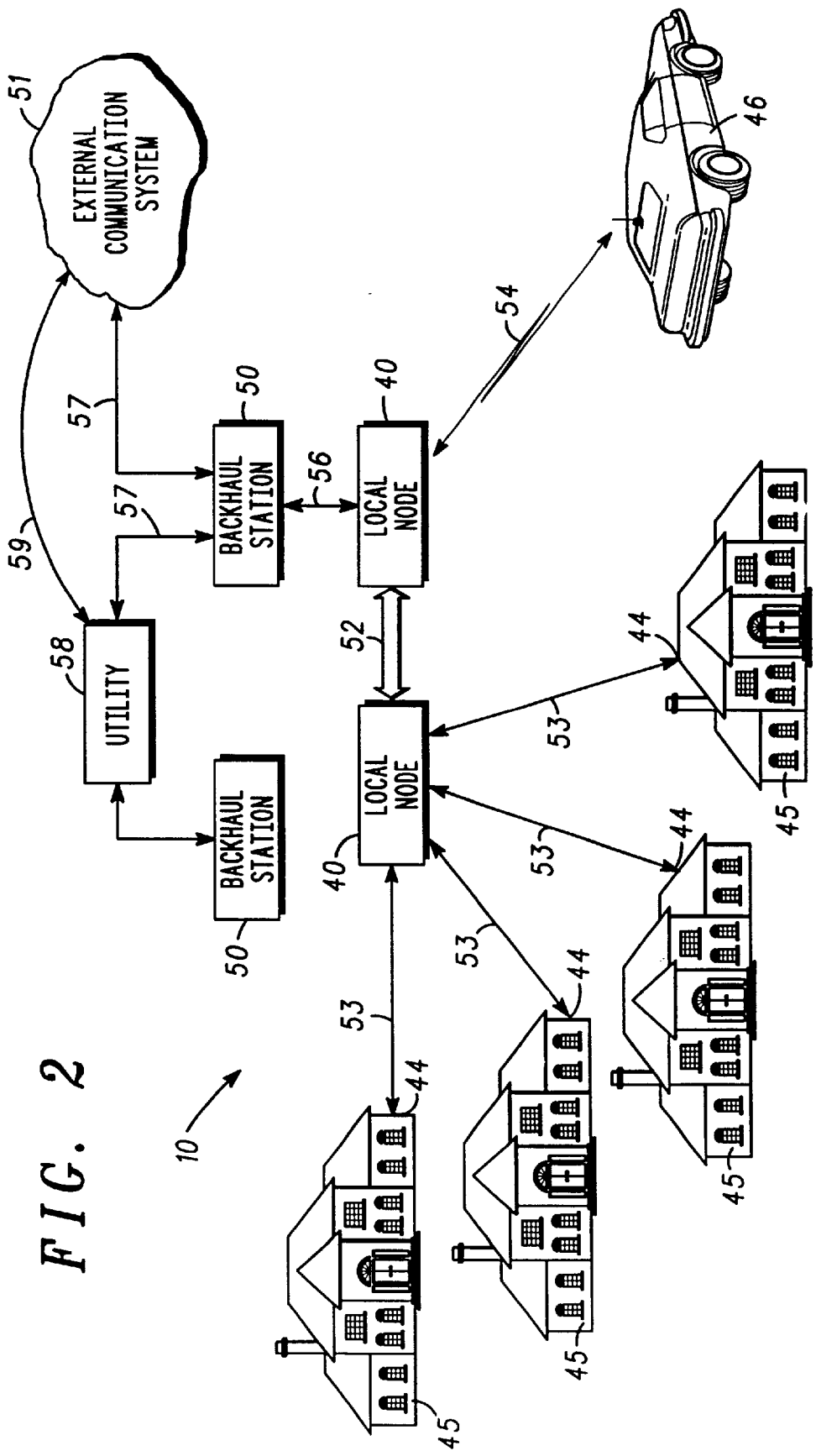
FIG. 2 is a simplified diagram illustrating portion of the communication network in accordance with a preferred embodiment of the present invention.

FIG. 2 is a simplified block diagram of a communication network in accordance with a preferred embodiment of the present invention. Network 10 includes a plurality of local nodes 40 distributed within, for example, a first coverage area. Local nodes 40 each include a wireless transceiver for communication with other local nodes within their coverage area. The local nodes establish peer to peer communication links among at least adjacent local nodes in their coverage area. These peer to peer links are preferably used to support communications between the local nodes and, further support routing of data among the nodes of a particular coverage area. In accordance with the preferred embodiment, each peer to peer link spans a relatively short distance, which allows for use of low power and low cost wireless transceivers.

Each coverage area also includes a multi-channel backhaul station 50 for communicating with entities outside a particular coverage area. Communications between any one of the local nodes and an entity outside a coverage area take place through a backhaul station associated with the coverage area. Local nodes that are not adjacent to the backhaul station within a coverage area are connected to the backhaul station through a concatenation of peer to peer wireless links among the cells. In a data collection application, for example, a multi-channel backhaul station 50 assembles data from particular local nodes in its coverage area and delivers the assembled data to external entity 58, which may be a utility. Local nodes located near the multi-channel backhaul station 50 preferably communicate directly with the backhaul station while local nodes further away communicate with the backhaul station through peer to peer links through other local nodes.

In accordance with one embodiment of the invention two way communication of data packets is provided. Data packets are delivered through the network of nodes to a termination node, and each packet includes a routing code. When a node receives a packet, it examines the routing code to determine if that node might be the packet's terminal node. A table look up operation is performed using the routing code as an index to a routing table. The table identifies a link, such as link 52 (FIG. 2) to use in routing the packet away from the node to an adjacent node. When a node concludes that it might be a terminal node for a packet, the node evaluates the identifier to determine if it is currently serving the consumer location to which the packet is directed. Other methods of routing data packets through the network are also suitable for use in the present invention. For example, routes for each data packet may be determined on a packet by packet basis.

In addition to data collection applications, the present invention is also suitable for performing messaging and location function. For example, a utility company implementing a network of the present invention may produce additional revenue by offering such messaging and location services. In accordance with these embodiments of the present invention, data may be communicated with external communication system 51.

As illustrated in FIG. 2, local node 40 is linked to a plurality of customer residences 45 for communicating with the customer residences. Preferably, local node 40 collects utility consumption data from each customer residences 45. After collecting consumption data, local node 40 delivers the collected data to a corresponding multi-channel backhaul station 50 via wireless links 52, which comprise peer to peer wireless links and a wireless link 56 between a local node 40 and multi-channel backhaul station 50. In accordance with the preferred embodiment, each local node is located at or near a power transformer which supplies electrical power to its corresponding consumer residencies. Normally, power transformers are located on utility poles near corresponding customer locations. Communications between each local node and customer residencies 45, preferably take place over a power line between each customer location and the transformer by way of a power line carrier. For example, communications information is modulated onto the power line and communicated between the customer residences and the local node. Addressing schemes are preferably used to direct communications over the power line carrier to customer locations 45. The use of power lines and their associated rights of way reduce the need for large capital acquisitions for providing communication functionality of network 10.

For example, each consumer residence communicates with local node 40 by way of a power line carrier, which preferably has a bandwidth, for example, on the order of one hundred kilobits per second (kbps). Peer to peer links 52 between the local nodes of the network preferably have a bandwidth, for example, on the order of 1.2 megabits per second (mbps). In accordance with the preferred embodiment, each successive link between a local node through the network of nodes to the backhaul station preferably has a bandwidth exceeding that of the previous link, for example by 1.2 mbps, to account for the additional data from intervening local nodes. In this particular embodiment, this additive effect results in a higher concentration of data near a multi-channel backhaul station 50. This may reduce the number of local, nodes that may be concatenated on a data link. In one embodiment of the present invention, additional local nodes are provided near the backhaul station to reduce congestion. In a preferred embodiment of the present invention, local nodes have sectorized antennas or directional antennas for communicating with other local nodes or the backhaul station.

In accordance with the preferred embodiment of the present invention, link 57 between entity 58 and multi-channel backhaul station 50 is a multi-channel high bandwidth link, having a bandwidth, for example, on the order of 600 mbps, and is preferably an optical fiber link. Other types of links are also suitable. Many utilities, for example, have existing links in place that are suitable for use as link 57. In accordance with a preferred embodiment, entity 58 receives data from a number of backhaul stations 50 distributed over a geographic region.

In one embodiment of the present invention, mobile units 46 request utility information by establishing RF link 54 with local node 40. RF link 54 is preferably a line-of-sight RF link similar to links 52. The request is routed through the network of local nodes 40 to consumer nodes 44. The data from each consumer node may be routed back and provided to the mobile unit over RF link 54. In accordance with this embodiment of the present invention, utility consumption data may be collected anywhere within the network. Furthermore, this embodiment of the present invention provides for two way data communication between mobile units nearby cell, or utility 58. Utility 58 may also function as a gateway to other networks or data sources through external communication system 51 via link 59.

FIG. 3 is a simplified block diagram of local node transceiver station 60 in accordance with preferred embodiment of the present invention. It should be appreciated that the illustrations of FIG. 3 are functional elements and do not necessarily represent discrete hardware or software elements. For example, two or more functional elements may be implemented in a single hardware or software element such as a processor, digital signal processor or reduced instruction set computer. Transceiver station 60 includes transceiver portion 62 and antennas 64 which are used for communicating with other local nodes. Depending on the cell's location, transceiver station may also communicate with backhaul station within its coverage area. Transceiver station 60 also includes power line carrier (PLC) transceiver 66 for communicating over power lines via links 53 (FIG. 2) to consumer locations 45 (FIG. 2). Transceiver station 60 also includes a controller 82 for performing various operations as described herein. PLC transceiver 66 is coupled to power lines 76. Controller 82 couples both wireless transceiver 62 and PLC transceiver 66 and controls the operation of both transceivers, as well as the interface between the units. Controller 82 also provides additional control over the radio frequency functions of the wireless transceiver 62. These functions include, among other things, timing and frequency control for communications over links 56 (FIG. 2). Wireless transceiver 62 is operative for providing a wireless link to transceiver stations of other local nodes within a same coverage area. In the preferred embodiment of the present invention, wireless transceiver 62 preferably operates at a relatively low power level and has a relatively low communication range, for example on the order of less than 300 meters. In the preferred embodiment, transceiver 62 is implemented as a radio frequency application specific integrated circuit. Antennas 62 may be implemented as one antenna or multiple antennas may be employed providing spacial diversity. In accordance with the preferred embodiment, wireless transceiver 62 operates in the Giga-Hertz frequency range, and preferably, within a portion of the ISM frequency band.

During a receive operation, wireless transceiver 62 receives signals from other local nodes within the same coverage area. Furthermore, transceiver 62 may receive information from a corresponding backhaul station within a coverage area. The signal is provided to controller 82 for processing through modem 80. Controller 82 is preferably implemented as a digital application specific integrated circuit. Modem 80 demodulates received signals and transfers it to controller 82. Controller 82, for example, may check a destination address of the received signal (e.g., data packet) and determines whether or not the data packet is directed to one of the consumer locations serviced by the local node. If the data pocket is directed to a consumer location served by the node, the data is directed to PLC transceiver 66 with appropriate addressing for receipt by the particular consumer location. PLC transceiver 66 transfers the data over the power line to the appropriate customer location by modulating the information onto power line 76. When the data packet is not addressed to one of the consumer locations serviced by cell 40, controller 82 employs a routing algorithm to determine which other transceiver stations within the coverage area to route the data packet to. The routing information is preferably included, for example as a destination address and re-modulated through modem 80 and transmitted from transceiver 62 through an appropriate antenna to another local node. Preferably, the data is transferred to an adjacent local node over the peer to peer link. When the data packet is received by the next local node, the destination address is reviewed by its controller and the data is either routed to a consumer location through PLC transceiver 66 or to a next local node. In accordance with the preferred embodiment of the present invention, packet switching is implemented by the local nodes.

FIG. 4 illustrates a simplified block diagram of a data packet suitable for use in accordance with the present invention. Data packet 86 includes synchronization field 88, identification field 90, message type identification field 92, data field 94, cyclic redundancy check (CRC) field 96, and a forward error correcting field (FEC) 98. Synchronization field 88 is used to synchronize circuitry and properly process a data packet. A known repetitive pattern is preferably used for synchronization field. ID field 90 is used to identify the entities associated with the packet. For example, in a preferred embodiment of the present invention, ID field 90 includes the originating sender's identification number, the destination identification, and may also include the sending unit's ID, and the ID of the next intended recipient of the packet. Message type ID field 92 identifies the type of message being transferred by the packet. For example, message field 92 may indicate the packet is a message delivered through the network or, for example, a periodic electric power consumption report being delivered through the network through a backhaul station and to a utility. In one embodiment of the present invention, data field 94 is encrypted to provide data security. Data field 94 carries the actual data being transferred by data packet 86.

In a meter reading application, for example, data field 94 carries a reading of an electrical meter at one consumer location 45 (FIG. 2). In the preferred embodiment, multiple packets deliver a single message. Multi-channel backhaul station 50 includes means for assembling packets to provide the entire message. CRC field 96 is used to detect errors in received data packets and is preferably implemented by applying a polynomial to a block of transmitted data. Upon receipt of the data packet, the polynomial is applied to the block of data and the result is compared to the appended code to detect any errors. If errors are detected the receiving node may request the data packet be resent.

In the preferred embodiment of the present invention, error correction and detection techniques are provided between each peer to peer wireless link 52 (FIG. 2). After a data packet is received and demodulated by one of the local nodes, its is checked for errors before further processing. Local nodes preferably correct the errors using an error correcting algorithm, or alternatively request re-transmission of a data packet from the sending local node or consumer location 45. Code combining techniques are preferably used within the peer to peer network of links in the system. In the preferred embodiment, the level of error coding is based upon a particular link and preferably depends of the present link quality. For example, the level of error coding preferably adapts to changing link conditions. For example, by matching the code rate to the link bit error rate on the packet by packet by basis. Code combining assist module 84 (FIG. 3) performs these functions in conjunction with controller 82 (FIG. 3).

In accordance with the preferred embodiment of the present invention, transmissions between local nodes 40 follow a slotted ALOHA protocol wherein, for example, transceiver 62 initiates transmissions during time slots over an access channel. Preferably, the access channel is randomized by frequency hopping to improve network operation environments that have significant interference. Random frequency hopping for example, randomize and reduces the potential occurrence of packet collisions on the access channel.

The routing of data packets within the network are preferably made in accordance with a routing algorithm implemented within the network of local nodes. Preferably, the path through the nodes that a data packet takes from a source node to a destination node is developed on a packet by packet basis as the packet is travelling through the system. This route is generally not predetermined before the packet is originally transmitted from the source node. For example, data packets preferably only identify a source node and a destination node for routing through the network and do not identify a particular route. In a preferred embodiment of the present invention, each of the nodes stores a local map of the adjacent and nearby local nodes in which it may transmit and receive data from and to. This map of local nodes is preferably updated as the network of nodes changes. In one embodiment of the present invention, data packets also include geographic location of their destinations. This may be based on a citywide grip map which is stored in the nodes. In this embodiment, local nodes 40 use the grip map to determine the direction a packet needs to travel to reach its destination nodes, or for example, to reach the destination zone in which its destination node is located. In another embodiment of the present invention, local nodes receive a link quality indicator to determine whether particular peer to peer links are of a sufficient quality before directing a packet along that link. When peer to peer links are not of sufficient quality, the nodes direct the packet to an alternate link preferably a link that is most nearly in the desired direction. In an alternate embodiment, a communication link is established over multiple paths which transfer the same data, which reduce the need for re-sending returned data packets when interference or blockage occurs in a particular path.

Figure 5:
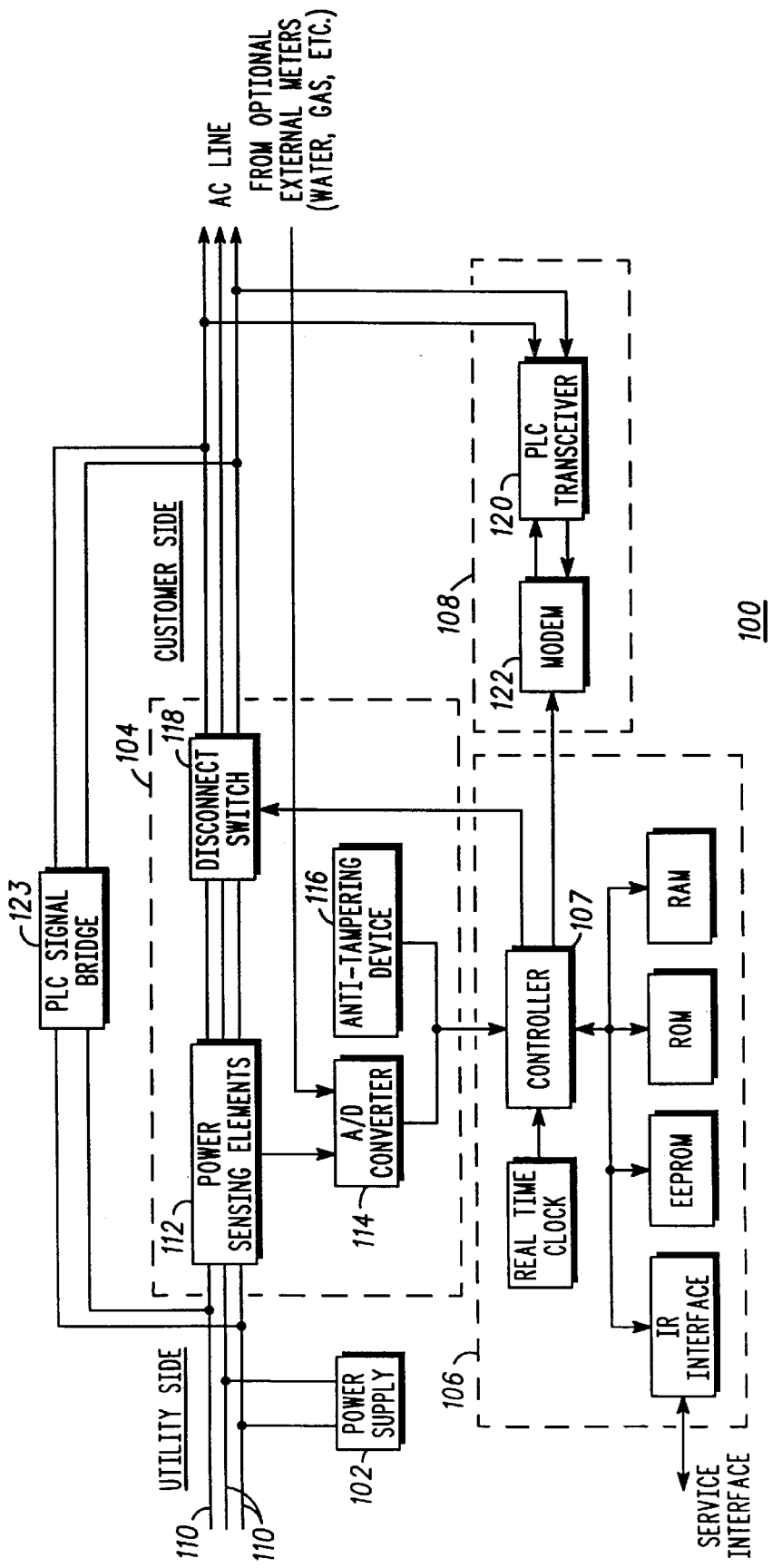
FIG. 5 is a simplified block diagram of a consumer transceiver in accordance with a preferred embodiment of the present invention.

FIG. 5 is a simplified block diagram of a consumer transceiver 100 in accordance with the preferred embodiment of the present invention. Consumer transceiver 100 is preferably housed within a power meter or metering device located at consumer location 45 (FIG. 2). Consumer transceiver 100 comprises a utility function unit 104, controller 106, and power line carrier unit 108. Consumer transceiver 100 may also include a power supply 102. Utility function unit 104 performs utility related functions such as meter reading and connecting and disconnecting. PLC unit 108 receives and transmits information onto power lines 110. Controller 106, among other things, provides an interface between PLC unit 108 and utility function unit 110. PLC transceiver 120 within PLC 108 during a receive operation detects communication signals on power line 110, which are demodulated by modem 122. Controller 106 determines if this signal is directed to this particular consumer node, and if so, performs proper processing of the data. In accordance with the preferred embodiments of the present invention, received communication signals include commands from an external utility to transmit power consumption data. In accordance with other embodiments of the present invention, received signals include other communication information, for example, from the utility to disconnect or connect the particular consumer's electricity. Additionally, other data may be provided for use by particular consumers through consumer node 45. During a transmit operation, controller 106 provides the data to modem 122 for modulation by PLC transceiver 120 onto power lines 110. In addition to communication with entities outside consumer node 45, PLC transceiver 120, in other embodiments of the present invention, communicates over customers internal power lines to other devices within the consumer location. For example, PLC transceiver 120 may communicate with a personal computer or LAN within a consumer location, for example, over the internal power lines. Furthermore, PLC transceiver 120 may communicate with and monitor appliances within the consumer location. In this embodiment of the present invention, network 10 is used to communicate with and control other devices within the consumer location via power lines.

Utility function unit 104 preferably includes power sensing element 112, A/D converter 114, anti-tampering device 116, and connect/disconnect switch 118. Anti-tampering device 116 may, for example, comprise a tilt switch. Power sensing element 112 preferably includes devices for measuring electrical power consumption at the consumer location. Power sensing elements include inductively coupled torroids or, for example, hall effect devices. A to D converter 114 is preferably used for digitizing analog readings of power sensing elements 112 and providing this power consumption information to controller 106 for subsequent delivery to a utility. Disconnect/connect switch 118 is operative for disconnecting and connecting electric service at the particular customer location in response to control signal from controller 106. Controller 106 sends the control signal in response to a message provided from the utility. PLC unit 108 receives and demodulates a connect or disconnect message and provides it to controller 106. Successful completion of connect and disconnect operations are preferably communicated back to the utility through PLC transceivers and through the network. PLC signal bridge 123 provides a communication path between the customer side and the utility side, for example when disconnect switch is open.

In another preferred embodiment of the present invention, consumer nodes 45 communicate directly over RF peer to peer links with local nodes. In this embodiment, a consumer node acts as a local node as part of the network of local nodes. In this embodiment of the present invention, communications over power line carriers are not necessarily required. In this embodiment, transceiver station 60 (FIG. 3) and consumer transceiver 100 are combined as part of the electric power meter and may communicate directly with a backhaul station or other local nodes 40. In this embodiment, each transceiver services one customer location instead of multiple customer locations through power line carriers. Combinations of consumer locations that communicate over power line carriers and consumer locations that act as local nodes are included in this embodiment.

Figure 6:
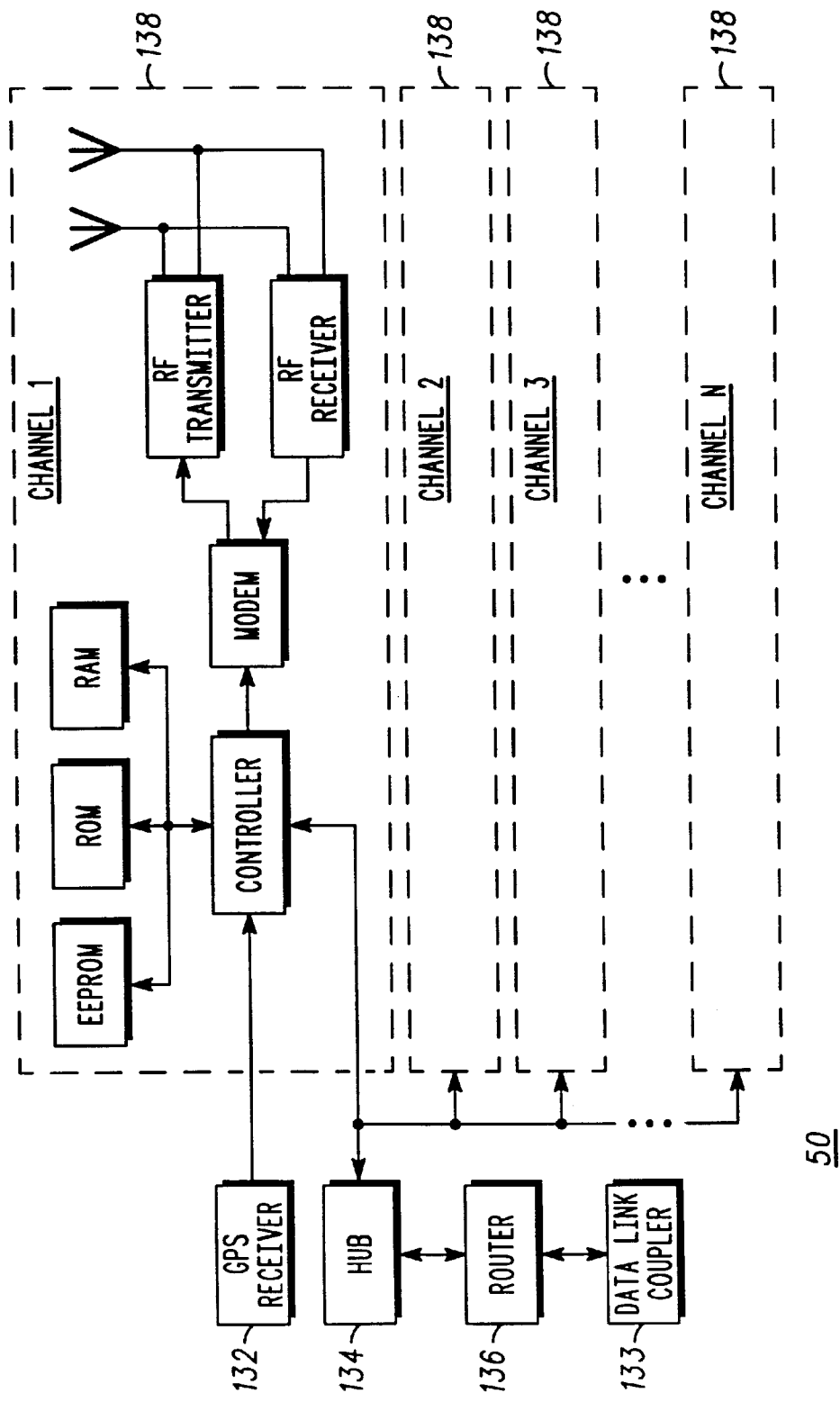
FIG. 6 is a simplified block diagram of a backhaul station transceiver in accordance with a preferred embodiment of the present invention.

FIG. 6 is a simplified block diagram of a backhaul station in accordance with the preferred embodiment of the present invention. Multi-channel backhaul station 50 includes GPS receiver 132, hub unit 134, router unit 136, and physical channels 138. Physical channels 138 are operative for servicing links with local nodes within the network of local nodes of the particular coverage area of multi-channel backhaul station 50. GPS receiver 132 supplies timing information to channels 138 for use in synchronization, among other things. Hub 134 and router 136 are operative for establishing connections between physical channels and appropriate external entities 58 such as a utility. Router 136 connects to the external entity through data link coupler 133, which may be used to route data to the utility over various means of communication. This may include internet communications, fiber optic communications, satellite communications, or RF communication links. Data link coupler 133 may also provide for communications between backhaul stations over link 30 (FIG. 1), in addition to communications with utilities over link 28.

In one embodiment of the present invention, network 10 (FIG. 2) includes a network operations control center (NOCC) within utility 58. The NOCC monitors loading on communication network 10, tracks consumer access to the network, and furthermore, determines appropriate billing services for the customer's use of network 10. In this embodiment of the present invention, consumers at locations 45 communicate with each other within network and among the various coverage areas 12 (FIG. 1). Customers may also communicate with systems outside network. Messages are preferably routed through utility 58 which is preferably coupled to external communication system 51 such as the internet or telephone system. Accordingly, NOCC provides a gateway to other networks and includes a router function. The router function is preferably used, among other things, to track nomadic RF users as they move through a network of transceiver nodes such as local nodes 40. In this embodiment, nomadic RF users (NRUs) periodically report in through the network over an RF link (such as link 52) established with a nearest local node 40. Accordingly, messages may be routed through network 10 to and from NRUs. Furthermore, when a location of an NRU is known to be within a particular cell, a message is routed to the NRU by addressing the message appropriately. NRUs access network 10 preferably through a standard ALOHA protocol with a special roaming routing code, which enables NRUs to access any local node within the network. This allows a priority function to provide the lowest latency route through the network, which is suitable for important data messaging such as emergency messages or digital voice communication. In this embodiment of the present invention, NRUs preferably do not communicate over PLCs links 53.

In accordance with a preferred embodiment of the present invention, local nodes including ring number and sector number whereby local nodes within the same ring and sector form a cluster, which are further differentiated from each other by a node identification number. Nodes within a cluster preferably communicate directly with each other via line-of-sight communications or relaying through adjacent nodes within the cluster. Transmission to and from backhaul stations and destination nodes involve relaying the data within a cluster and connecting to a new cluster a ring closer to the backhaul station or destination node. Accordingly, a high percentage of nodes located near the backhaul station directly communicate with the backhaul station providing for a wideband high data rate service connection.

Thus, a method and system for providing utility consumption data has been described. The consumption data is provided over power line carrier links to local nodes and routed through a network of local nodes over peer-to-peer line-of-sight RF links to a utility service provider. Backhauler nodes combine the utility consumption data from the local nodes within a coverage region for routing to the utility service provider. Consumer nodes include sensing elements for measuring the utility consumption data, and switching elements for connecting or disconnecting the utility from a consumer location. Messages may be sent through the network requesting the utility consumption data and for activating the switching elements. Preferably, consumer locations are polled for utility consumption data.

A data transfer system and method for collecting data has also been described. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

The system and method of the present invention is also suitable, for example, for two-way data transfer, geolocation of mobile units within a coverage area, and sending pages within the coverage area.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of communicating utility consumption data using a network of local nodes (40) arranged within a coverage area (12) wherein adjacent local nodes within the coverage area communicate over RF links (52), a plurality consumer nodes (44) within the coverage area wherein each consumer node is coupled to one of the local nodes by a power line carrier link (53), and a backhauler node (50) located within the coverage area and coupled to local nodes adjacent to the one local node by RF links (52), the method comprising the steps of:

determining utility consumption data for consumer location (45) associated the consumer nodes;

transferring the utility consumption data over the power line carrier links to the local node associated with the consumer node;

routing the utility consumption data over the RF links through the network of local nodes to the backhauler node;

the backhauler node combining the consumption data from several of the local nodes for delivery to a utility service provider (58);

at a first consumer node, transmitting a consumer data message over a first power line carrier link to a first local node associated with the first consumer node, the consumer data message including a destination address of a second consumer node;

routing the consumer data message through the network of local nodes based on the destination address to a second local node, the second local node associated with a second consumer node; and transmitting the consumer data message over a second power line carrier link to the second consumer node, the second consumer node providing the at least a portion of the consumer data message to a consumer location associated therewith;

receiving a second utility consumption request data message at a local node identifying a mobile unit;

determining a location of a mobile unit within the first coverage area;

routing the second data message to a local node near the location; and transmitting the utility consumption data to the mobile unit from the local node by a line-of-sight RF link.

2. The method as claimed in claim 1 further comprising the steps of:

receiving a utility consumption request message over an RF link from a mobile unit at one of the local nodes;

the one local node transmitting the utility consumption request message over the power line carrier links to consumer nodes associated with the one local node, wherein the transferring step is performed in response to the consumption request message and further comprises the step of transferring the utility consumption data for the consumer locations associated with the consumer nodes to the one local node over the power line carrier links; and the one local node transmitting the utility consumption data for each of the consumer locations over the RF link to the mobile unit.

3. The method as claimed in claim 1 wherein the consumer nodes include a controller and utility sensing element coupled to the power line carrier, and wherein the determining step is performed by the controller and utility sensing element, the method further comprising the step of receiving a utility consumption request data message through the network at the consumer nodes requesting the utility consumption data, and wherein the transferring step is performed in response to the receiving step.

4. The method as claimed in claim 3 wherein the RF links coupling adjacent local nodes comprise line-of-sight RF links and wherein the local nodes comprise an antenna located on utility poles near the consumer locations, the antenna for communicating substantially horizontally polarized signals over the RF links.

5. The method as claimed in claim 3 further comprising the steps of:

receiving a consumer data message at the backhauler node, the consumer data message including a destination address identifying one consumer node, routing the consumer data message through the network of local nodes in the coverage area to the local node associated with the consumer node;

transmitting the consumer data message over the power line carrier to the associated consumer node; and providing a portion of the consumer data message to the consumer location.

6. The method as claimed in claim 3 wherein the transferring step includes the step of including a consumer location ID along with the utility consumption data, the consumer location ID identifying the consumer node associated with the utility consumption data, and wherein the routing step is performed by the local nodes and further comprises the step of routing the consumer location ID and associated utility consumption data in packetized form through the network.

7. The method as claimed in claim 6 wherein the routing step further comprises the step of including a destination address within the packetized form of utility consumption data, the destination address identifying the utility service provider.

8. The method as claimed in claim 7 wherein the consumer nodes further include a switching element coupled to the controller for either connecting or disconnecting a utility line from the consumer location associated with each consumer node, the method further comprising the step of receiving a switching data message through the network and over the power line carrier link at one of the consumer nodes, the switching data message instructing the controller to cause the switching element to either connect or disconnect the utility line from the consumer location associated with the one consumer node, the switching data message including a destination address identifying the one consumer node, and wherein the routing step includes the step of routing the switching data message through the network of local nodes using the destination address.

9. A method of communicating utility consumption data using a mobile collection unit, a network of local nodes arranged wherein adjacent location nodes communicate over RF links, and a plurality consumer nodes each coupled to one of the local nodes by a power line carrier link, the method comprising the steps of:

transmitting a utility consumption request message from the mobile collection unit over an RF link to a nearby one of the local nodes;

the nearby one local node transmitting the utility consumption request message over the power line carrier links to consumer nodes associated with the one local node, transferring utility consumption data from each consumer node over the power line carrier links to the one nearby local node;

the one nearby local node transmitting the utility consumption data over RF link to the mobile unit;

said one local node routing the utility consumption request message to other local nodes of said network; and the other local nodes transmitting the utility consumption request message to consumer nodes associated therewith over power line carrier links; and including a consumer location ID along with the utility consumption data, the consumer location ID identifying the consumer node associated with the utility consumption data, and wherein the utility consumption data is routed through the network to the one nearby local node and transmitted over the RF link to the mobile collection unit.

10. The method as claimed in claim 9 wherein the RF links coupling adjacent local nodes comprise line-of-sight RF links and wherein the local nodes comprise an antenna located on utility poles near the consumer locations, the antenna for communicating substantially horizontally polarized signals over the RF links.

11. A two-way data transfer system for communicating data comprising:

a network of local nodes (40) arranged within a coverage area (12) wherein adjacent local nodes within the coverage area communicate over RF links (52);

a plurality consumer nodes (44) within the coverage area wherein each consumer node is coupled to one of the local nodes by a power line carrier link (53), the consumer nodes collecting data for consumer locations (45) associated the consumer nodes;

a backhauler node (50) located within the coverage area and coupled to local nodes adjacent to the one local node by RF links (52), wherein the collected data is transferred over the power line carrier links to the local node associated with the consumer node, the collected data is routed over the RF-links through the network of local nodes to the backhauler node, and the backhauler node combines the collected data from several of the local nodes for delivery to data user (58);

a first consumer node having means for transmitting a consumer data message over a first power line carrier link to a first local node associated with the first consumer node, the consumer data message including a destination address of a second consumer node;

the consumer data message is routed through the network of local nodes based on the destination address to a second local node, the second local node associated with a second consumer node; and the consumer data message is transmitted over a second power line carrier link to the second consumer node, the second consumer node providing the at least a portion of the consumer data message to a consumer location associated therewith;

receiving a second utility consumption request data message at a local node identifying a mobile unit;

determining a location of a mobile unit within the first coverage area;

routing the second data message to a local node near the location; and transmitting the utility consumption data to the mobile unit from the local node by a line-of-sight RF link.

12. The system as claimed in claim 11 wherein the local nodes includes means for receiving a data request message over an RF link from a mobile unit at one of the local nodes, and transmits the data request message over the power line carrier links to consumer nodes associated with the one local node, wherein the requested data for the consumer locations associated with the consumer nodes is transferred to the one local node over the power line carrier links; and the one local node includes means for transmitting the requested data for each of the consumer locations over the RF link to the mobile unit.

13. The system as claimed in claim 11 wherein the data comprises utility consumption data and wherein the consumer nodes comprise:

a controller; and a utility sensing element for monitoring the utility consumption data and coupled to the power line carrier, wherein the controller receives a utility consumption request data message through the network at the consumer nodes, the data message requesting the utility consumption data, and wherein the utility consumption data is transferred is performed in response to the receipt of the utility consumption request data message.

14. The system as claimed in claim 13 wherein the RF links coupling adjacent local nodes comprise line-of-sight RF links and wherein the local nodes comprise an antenna located on utility poles near the consumer locations, the antenna for communicating substantially horizontally polarized signals over the RF links.

15. The system as claimed in claim 13 wherein a the controller sends consumer location ID along with the utility consumption data, the consumer location ID identifying the consumer node associated with the utility consumption data, the local nodes route the consumer location ID and associated utility consumption data in packetized form through the network.

16. The system as claimed in claim 15 wherein the controller includes a destination address within the packetized form of utility consumption data, the destination address identifying the utility service provider as a destination for the utility consumption data.

17. The system as claimed in claim 16 wherein the consumer nodes further include a switching element coupled to the controller for either connecting or disconnecting a utility line from the consumer location associated with each consumer node, and wherein the controller receives a switching data message through the network and over the power line carrier link at one of the consumer nodes, the switching data message instructing the controller to cause the switching element to either connect or disconnect the utility line from the consumer location associated with the one consumer node, the switching data message including a destination address identifying the one consumer node, and the switching data message is routed through the network of local nodes using the destination address.

18. A method of communicating data among a network of local nodes (40) wherein adjacent local nodes of the network communicate over line-of-sight RF links (52), a plurality consumer nodes (44) each coupled to one of the local nodes by a power line carrier link (53), the method comprising the steps of:

transmitting a data message (86) from a first consumer node over the power line carrier link to an associated local node (40), the data message identifying a destination consumer node;

routing the data packet amongst the local nodes (40) over the line-of-sight RF link (52) to a local node associated with the destination consumer node;

transmitting the data message to the destination consumer node (44) over the power line carrier (53) which couples the destination consumer node with the local node associated with the destination consumer node, the second consumer node providing at least a portion (94) of the data message to a consumer location (45) associated with the consumer node;

the network of local nodes is a first network of local nodes defining a first coverage area (12);

the network further comprises a first backhauler node (50) located within the first coverage area and coupled to nearby local nodes by line-of-sight RF links (56), the network further comprises a second network of local nodes defining a second coverage area including a second backhauler node located therein;

the destination consumer node is located within the second coverage area;

wherein the routing step further comprise the steps of:

routing the data packet amongst the local nodes of the first coverage area to the first backhauler node;

the first backhauler node transferring the data packet over a high data bandwidth link to the second backhauler node;

the second backhauler node transmitting the data packet to a local node within the second coverage area; and routing the data packet amongst local nodes of the second coverage area to the local node associated with the destination consumer node;

receiving a second utility consumption request data message at a local node identifying a mobile unit;

determining a location of a mobile unit within the first coverage area;

routing the second data message to a local node near the location; and transmitting the utility consumption data to the mobile unit from the local node by a line-of-sight RF link.

19. A method as claimed in claim 18 wherein the backhauler node being further coupled to a communication system (51) external to the network, and wherein the method further comprises the steps of:

receiving a plurality of data messages at the backhauler node, the data messages being from consumer nodes;

combining the plurality of data messages at the backhauler node; and transmitting the combined data messages over a high data bandwidth link from the backhauler node to a data consumer.

20. A method as claimed in claim 18 further comprising the step of:

the local nodes including an error correction portion in the data packet, the error correction being based on channel conditions of the line-of-sight RF links.

21. A method as claimed in claim 20 wherein the local nodes further determine a channel coding rate based on a bit-error-rate of each line-of-sight RF link, and perform channel coding on the data packet in accordance with the channel coding rate.

* * * * *